(12) United States Patent
Ahn et al.

(10) Patent No.: US 10,469,133 B2
(45) Date of Patent: Nov. 5, 2019

(54) ANTENNA DEVICE AND PORTABLE TERMINAL INCLUDING THE SAME

(71) Applicant: WITS Co., Ltd., Yongin-si, Gyeonggi-do (KR)

(72) Inventors: Dae Ung Ahn, Suwon-si (KR); Hyung Wook Cho, Suwon-si (KR); Jun Seung Yi, Suwon-si (KR); Yu Jin Lee, Suwon-si (KR); Seung Hun Ryu, Suwon-si (KR); Sang Beom Lee, Suwon-si (KR); Dae Ki Lim, Suwon-si (KR); Jae Hyoung Cho, Suwon-si (KR); Si Hyung Kim, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 3 days.

(21) Appl. No.: 15/785,955

(22) Filed: Oct. 17, 2017

(65) Prior Publication Data
US 2018/0241438 A1    Aug. 23, 2018

(30) Foreign Application Priority Data
Feb. 22, 2017    (KR) ........................ 10-2017-0023701

(51) Int. Cl.
| H01Q 1/24 | (2006.01) |
| H01Q 7/00 | (2006.01) |
| H04B 5/00 | (2006.01) |
| H01Q 19/28 | (2006.01) |
| H01Q 1/22 | (2006.01) |
| H01F 5/00 | (2006.01) |
| H01F 27/28 | (2006.01) |
| H01F 38/14 | (2006.01) |

(52) U.S. Cl.
CPC ........... *H04B 5/0087* (2013.01); *H01F 5/003* (2013.01); *H01F 27/2804* (2013.01); *H01Q 1/2216* (2013.01); *H01Q 1/24* (2013.01); *H01Q 7/00* (2013.01); *H01Q 19/28* (2013.01); *H01F 38/14* (2013.01)

(58) Field of Classification Search
CPC ........ H01Q 1/2216; H01Q 1/22; H01Q 19/28; H01Q 1/24; H01Q 1/243; H01Q 1/38; H01Q 7/00; H01F 38/14; H01F 27/2804; H01F 5/003; H04B 5/00; H04B 5/0087
See application file for complete search history.

(56) References Cited

U.S. PATENT DOCUMENTS

| 5,541,613 A * | 7/1996 | Lam ....................... H01Q 11/10 343/792.5 |
| 5,621,422 A * | 4/1997 | Wang ....................... H01Q 1/36 343/700 MS |
| 5,846,883 A * | 12/1998 | Moslehi ................. H01J 37/321 438/711 |

(Continued)

FOREIGN PATENT DOCUMENTS

| KR | 10-1467677 B1 | 12/2014 |
| KR | 10-2016-0063120 A | 6/2016 |

*Primary Examiner* — Tho G Phan
(74) *Attorney, Agent, or Firm* — Harness, Dickey & Pierce, P.L.C.

(57) ABSTRACT

An antenna device includes a first wiring may include a spiral shape forming an empty region therein, and a second wiring disposed inside or outside of the first wiring. The second wiring is disposed to be spaced apart from the first wiring, and includes a first ring-shaped wiring and a second ring-shaped wiring, which are concentric to each other.

17 Claims, 7 Drawing Sheets

(56) References Cited

U.S. PATENT DOCUMENTS

| | | | |
|---|---|---|---|
| 2011/0094996 A1* | 4/2011 | Yamazawa | H01J 37/321 216/68 |
| 2013/0200043 A1* | 8/2013 | Tojo | H05H 1/46 216/68 |
| 2016/0148752 A1* | 5/2016 | Moon | H04B 5/0087 343/867 |

* cited by examiner

ANTENNA DEVICE AND PORTABLE TERMINAL INCLUDING THE SAME

CROSS-REFERENCE TO RELATED APPLICATION(S)

This application claims benefit under 35 USC 119(a) to Korean Patent Application No. 10-2017-0023701 filed on Feb. 22, 2017 in the Korean Intellectual Property Office, the disclosure of which is incorporated herein by reference in its entirety.

BACKGROUND

1. Field

The following description relates to an antenna device and a portable terminal including the same.

2. Description of Related Art

Portable terminals have recently been provided with a system to wirelessly transmit power to charge a battery, or functions such as radio frequency identification (RFID), near field communications (NFC), magnetic secure transmissions (MST), and the like.

In addition, these functions are generally performed through an antenna wiring having a coil form, and accordingly, the portable terminal is mounted with an antenna device including the antenna wiring.

Further, NFC, MST, and the like are used for various services such as traffic alerts, ticketing, mobile payments, and the like.

However, because most antenna wirings are manufactured in a simple spiral shaped pattern, a recognition rate may be decreased during wireless communications, depending on distance between or positions of the antenna wiring with respect to a reader.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an antenna device configured to increase recognition rate and a portable terminal including the same.

In accordance with an embodiment, there is provided an antenna device, including: a first wiring may include a spiral shape forming an empty region therein; and a second wiring disposed inside or outside of the first wiring, wherein the second wiring may be disposed to be spaced apart from the first wiring, and may include a first ring-shaped wiring and a second ring-shaped wiring, which may be concentric to each other.

The first ring-shaped wiring and the second ring-shaped wiring may be formed to be circular.

Second wirings may be disposed inside of the first wiring.

The second wiring further may include a connection wiring connecting the first ring-shaped wiring to the second ring-shaped wiring.

The first ring-shaped wiring and the second ring-shaped wiring may be each formed in an arc shape having two ends.

The second wiring may include a first connection wiring connecting one end of the first ring-shaped wiring to one end of the second ring-shaped wiring.

The second wiring may include a second connection wiring connecting another end of the first ring-shaped wiring to another end of the second ring-shaped wiring.

The two ends of the first ring-shaped wiring may be aligned with the two ends of the second ring-shaped wiring so that a disconnected portion of the first ring-shaped wiring may be disposed to correspond to a disconnected portion of the second ring-shaped wiring.

The antenna device may further include: a coil wiring disposed inside or outside of the first wiring and configured to perform wireless power transmission.

The antenna device may further include: a third wiring disposed inside or outside of the first wiring and configured to perform magnetic secure transmission (MST).

A distance between the first ring-shaped wiring and the second ring-shaped wiring may be 400 µm or less.

The first wiring may be configured to perform as a near field communication (NFC) antenna or a magnetic resonance wireless charging coil.

The first wiring and the second wiring may be formed as a circuit pattern on an insulating substrate, and the first ring-shaped wiring and the second ring-shaped wiring may be disposed on one surface of the insulating substrate.

The antenna device may further include: a magnetic part disposed at one side of the insulating substrate.

The second wiring may be disposed within a range of a magnetic field formed by the first wiring.

The antenna device may further include: a coil part; and a magnetic part may include a flat plate shape disposed on one side of the coil part and connected to the coil part to provide a magnetic path of a magnetic field generated from an antenna wiring of the coil part.

The coil part may be configured to concentrate a magnetic flux by generating the magnetic field utilizing a capacitance generated between the first and the second ring-shaped wirings.

In accordance with an embodiment, there is provided a portable terminal, including: a terminal body; a first wiring may include a spiral shape electrically connected to the terminal body; and a second wiring disposed inside or outside of the first wiring, wherein the second wiring includes a pair of ring-shaped wirings being concentric and may include different diameters.

The pair of ring-shaped wirings may be disposed on a same plane.

The second wiring may be disconnected from the terminal body.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
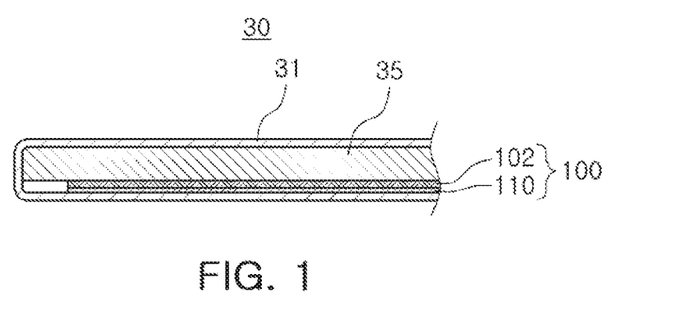
FIG. 1 is a cross-sectional view schematically illustrating a cross-section of a portable terminal, according to an embodiment.
Figure 2:
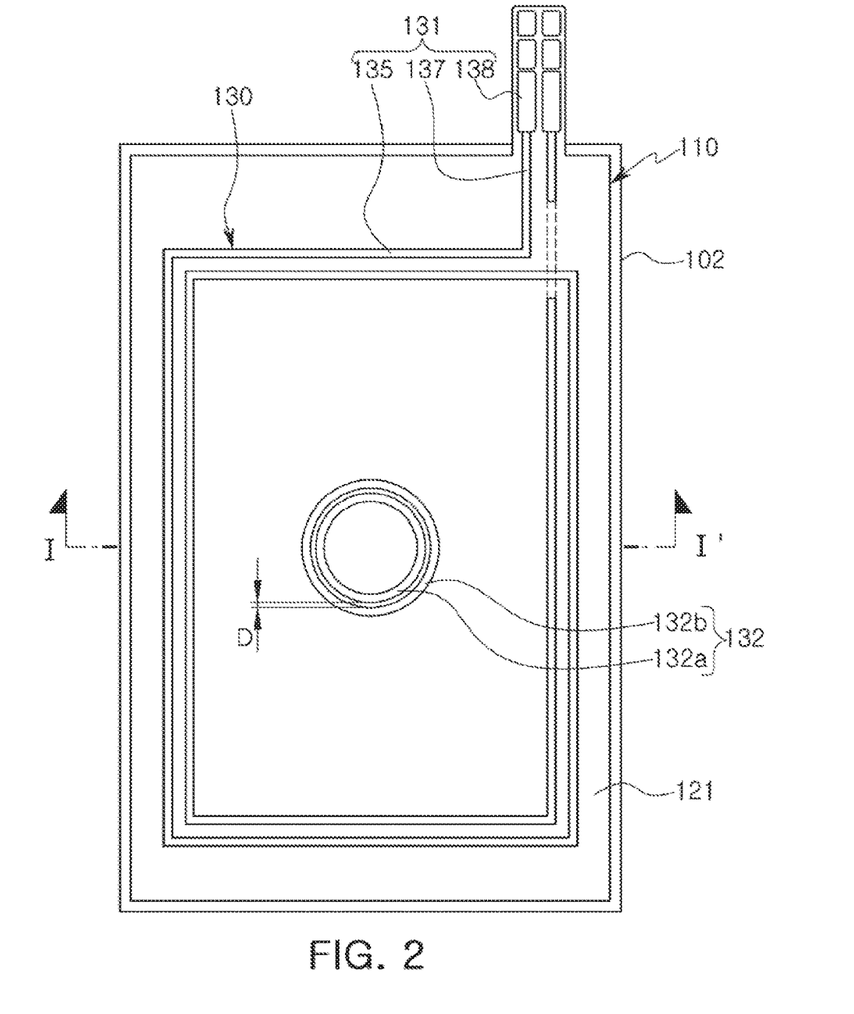
FIG. 2 is a plan view schematically illustrating an antenna device of FIG. 1.
Figure 3:
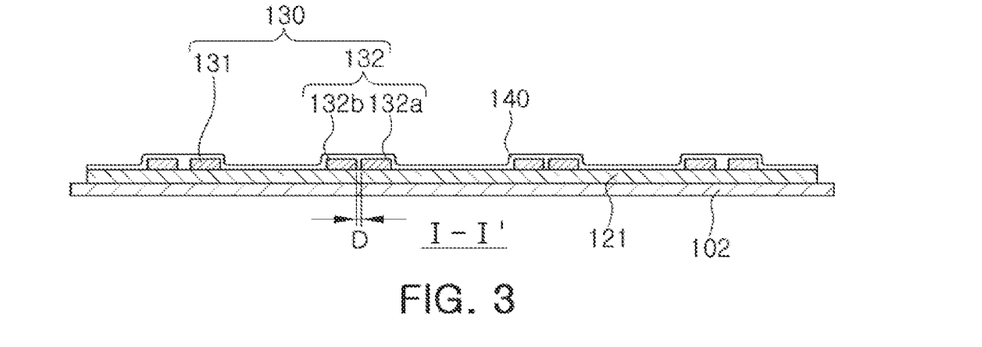
FIG. 3 is a cross-sectional view taken along a line I-I' of FIG. 2.

FIG. 1 is a cross-sectional view schematically illustrating a cross-section of a portable terminal, according to an embodiment. In addition, FIG. 2 is a plan view schematically illustrating an antenna device of FIG. 1 and FIG. 3 is a cross-sectional view taken along a line I-I' of FIG. 2.

A portable terminal, according to an embodiment includes a cellular phone (or a smartphone). For example, examples of the portable terminal or electronic device, according to various embodiments, may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device. In some embodiments, examples of the wireless power transmitter or electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, or an electronic picture frame.

Referring to FIG. 1, the portable terminal 30 includes a terminal body 35 to which main components are coupled to operate the portable terminal, and an antenna device 100, which is electrically connected to the terminal body 35 and performs wireless communications with a wireless signal transmitter (e.g., a near field communications (NFC) tag).

The antenna device 100 is accommodated in a case 31 of the portable device 30 and is directly attached or connected to an inner surface of the case 31 or disposed to be maximally adjacent thereto.

The antenna device 100 includes a coil part 110, and a magnetic part 102.

The magnetic part 102 having a flat plate shape (or a sheet shape) is disposed on one side (e.g., between the coil part and the terminal body) of the coil part 110 and is fixedly attached or connected to the coil part 110. The magnetic part 102 provides a magnetic path of a magnetic field generated from an antenna wiring of the coil part 110. To this end, the magnetic part 102 is formed of a material that is malleable and can be easily configured or formed as the magnetic path, and for example, a ferrite sheet may be used.

Although not illustrated, a metal sheet may also be further added to an outer surface of the magnetic part 102 to shield electromagnetic waves or a leakage magnetic flux, as needed. The metal sheet is formed of aluminum, or the like, but a material of the metal sheet is not limited thereto.

In addition, the antenna device 100 may have an adhesive part (not illustrated) interposed between the coil part 110 and the magnetic part 102 so that the coil part 110 and the magnetic part 102 are firmly fixed and adhered to each other.

The adhesive part may be disposed between the coil part 110 and the magnetic part 102, and may bond the magnetic part 102 and the coil part 110 to each other. Such an adhesive part may be formed of an adhesive sheet or an adhesive tape, and may also be formed by coating a surface of the coil part 110 or the magnetic part 102 with an adhesive or a resin having adhesive properties.

In addition, the adhesive part may contain ferrite powder particles. The adhesive part may have magnetism together with the magnetic part 102.

In one embodiment, the coil part 110 is configured or formed as a substrate. More specifically, the coil part 110 includes an insulating substrate 121, an antenna wiring 130 formed on at least one surface of the insulating substrate 121, and an insulating protective layer 140.

The insulating substrate 121 is a substrate onto which the antenna wiring 130 is formed on one surface or opposite surfaces thereof. For example, an insulating film (e.g., a polyimide film) is used. In this example, the coil part 110 has a configuration, a shape or a form of flexible printed circuit board (PCB). However, the insulating substrate is not limited thereto, and may be formed of various materials as long as the insulating substrate has a thin thickness and a circuit wiring is formed on the opposite surfaces of the insulating substrate.

The antenna wiring 130 is a circuit wiring configured or formed using the opposite surfaces of the insulating substrate 121. The antenna wiring 130 is made of a copper foil or similar material.

The antenna wiring 130, according to an embodiment, is manufactured by patterning double sided copper clad laminates (CCL). In addition, the antenna wiring 130 is formed by performing a photolithography method on the opposite surfaces of a flexible insulating substrate such as a film, and is manufactured, for example, as the flexible PCB (FPCB) having a double sided structure. Accordingly, a thickness of the coil part 110 is very thin. However, the coil part 110 may be manufactured in a multilayer substrate, or may also be manufactured in a form of the printed circuit board (PCB) having rigidity, depending on the application of the coil part 110 or needs of the portable terminal 30.

However, the coil part 110 performs at least one function of radio frequency identification (RFID), near field communication (NFC), and magnetic secure transmissions (MST). Thus, the coil part 110 may be used as an NFC antenna.

The antenna wiring 130 includes a first wiring 131 and a second wiring 132.

The first wiring 131 includes a spiral wiring 135, a lead wiring 137, and a connection pad 138.

The connection pad 138 includes a contact point at which the coil part 110 is electrically connected to the terminal body 35.

The spiral wiring 135 is disposed on one surface of the insulating substrate 121. In addition, at least a portion of the lead wiring 137 is disposed on the other surface of the insulating substrate 121. In another example, the lead wiring 137 is disposed on the same one surface as the spiral wiring 135. In an example, the lead wiring 137 is a wiring connecting the spiral wiring 135 and the connection pad 138 to each other. However, the configuration of the present disclosure is not limited thereto, and various deformations may be possible. For example, the spiral wiring 135 may also be formed on the other surface of the insulating substrate 121, or the entirety of the lead wiring 137 may be disposed on the other surface of the insulating substrate 121.

The spiral wiring 135 has a spiral shape, and may have generally a ring shape in which an empty space or region is formed. Therefore, the spiral wiring 135 may include a plurality of coil turns, and both ends thereof are each connected to the lead wiring 137.

The second wiring 132 is disposed in an inner region or inside of the first wiring 131, and is spaced apart from the first wiring 131 by a predetermined distance without being connected to or in contact with the first wiring 131. In addition, the second wiring 132 is not electrically connected to or disconnected from other components, such as the terminal body 35. Therefore, the second wiring 132 functions as a dummy wiring.

The second wiring 132 includes at least two ring-shaped wirings 132a and 132b. According to an embodiment, the second wiring 132 includes a first ring-shaped wiring 132a disposed at a central portion of the first wiring 131, and a second ring-shaped wiring 132b disposed at an outer portion of the first ring-shaped wiring 132a. The first ring-shaped wiring 132a and the second ring-shaped wiring 132b are concentric, and are disposed to be spaced apart from each other by a predetermined distance D.

In addition, both the first ring-shaped wiring 132a and the second ring-shaped wiring 132b are disposed on one surface of the insulating substrate 121. Therefore, according to an embodiment, the first ring-shaped wiring 132a and the second ring-shaped wiring 132b are concentric, as a pair of circular wirings having different diameters.

In addition, according to an embodiment, the first ring-shaped wiring 132a and the second ring-shaped wiring 132b are not electrically connected to each other. However, the first ring-shaped wiring 132a and the second ring-shaped wiring 132b are not limited thereto, but may be variously configured as in various embodiments described to be below.

The first ring-shaped wiring 132a and the second ring-shaped wiring 132b are disposed to be spaced apart from each other by a distance D. For example, the distance D between the first ring-shaped wiring 132a and the second ring-shaped wiring 132b may be 400 μm or less. In an example in which the distance is greater than 400 μm, capacitance between the first ring-shaped wiring 132a and the second ring-shaped wiring 132b may be difficult to form significantly decreasing an effect produced by the second wiring 132.

The coil part 110, according to an embodiment, concentrates a magnetic flux by generating the magnetic field utilizing the capacitance generated between the pair of ring-shaped wirings 132a and 132b configuring or forming the second wiring 132. Therefore, the first ring-shaped wiring 132a and the second ring-shaped wiring 132b are disposed to be very close and adjacent to each other so that the capacitance may be easily generated therebetween.

The second wiring 132 is disposed in the magnetic field formed by the first wiring 131. Accordingly, the first wiring 131 forms or produces the magnetic field to influence on the second wiring 132.

In an example in which a frequency of the magnetic field is a high frequency, because a skin effect is increased in the second wiring 132, current resistance of the second wiring 132 is increased. On the other hand, as the frequency is high, reactance generated from the second wiring 132 is decreased. Therefore, in an example in which the magnetic field has the high frequency, a flow of current (e.g., an inner and outer diameter direction) occurs in a form of capacitor in the second wiring 132.

In addition, a new magnetic field is generated around the second wiring 132 by such a flow of current, and the new magnetic field provides an effect of concentrating the magnetic field formed by the first wiring 131 into the second wiring 132.

Therefore, the second wiring 132 is disposed at a position at which the magnetic field formed by the first wiring 131 is desired to be concentrated.

An embodiment illustrates an example in which the second wiring 132 is disposed in the inner region or inside of the first wiring 131, but the configuration of the present disclosure is not limited thereto and various alternative configurations may be possible. For example, the second wiring 132 may be disposed in an outer region or outside of the first wiring 131 as long as the second wiring 132 is included, disposed, or positioned within a range of the magnetic field formed by the first wiring 131.

Further, an embodiment illustrates a case in which the coil part 110 has the antenna wiring 130 formed on the insulating substrate 121 as a conductive wiring, by way of example. However, the configuration of the present disclosure is not limited thereto.

For example, the coil part 110 may be variously configured, for example, the coil part 110 is formed of a press coil formed by press-processing a metal board, a flat type coil (edge wise coil) coated with insulating coating, or the like.

The insulating protective layer 140 is disposed on the antenna wiring 130. The insulating protective layer 140 is disposed on a surface of the insulating substrate 121 onto which the antenna wiring 130 is disposed, located, or positioned, and is disposed to cover the antenna wiring 130. The insulating protective layer 140 is provided to protect the antenna wiring 130 from an exterior of the antenna device and to secure insulation from the exterior. Also, the connection pad 138 may be in contact with an external component and may be electrically connected to the external component. Therefore, the insulating protective layer 140 on the connection pad 138 may be partially removed, and as a result, at least a portion of the connection pad 138 may be exposed to the exterior.

The antenna device, according to an embodiment configured as described above, is configured to concentrate the magnetic flux on a specific position through the second wiring of the dummy coil form. Therefore, at the time of performing near field communication (NFC), the recognition rate for an NFC tag is increased. In addition, because a conventional antenna device may be utilized, the antenna device may be easily manufactured.

Furthermore, an embodiment illustrates an example in which the antenna wiring 130 includes only the first wiring 131 and the second wiring 132, by way of example, but the antenna wiring 130 may further include a wiring (hereinafter, referred to as a third wiring (not illustrated)) similar to the first wiring 131, as needed.

The third wiring is selectively disposed in the inner region or the outer region, or inside or outside of the first wiring 131. In this example, the first wiring 131 is used for NFC, and the third wiring is used for magnetic secure transmissions (MST). However, the first wiring 131 and the third wiring are limited thereto, and may be variously deformed. For example, the first wiring 131 would be used for MST and the third wiring would be used for NFC. The third wiring may be used for wireless power transmission.

In addition, an embodiment illustrates an example in which the first wiring 131 is used as the antenna of NFC, by way of example, but the first wiring 131 is not limited thereto, and may also be used as a magnetic resonance wireless charging coil, as needed.

Meanwhile, the present disclosure is not limited to the embodiments described above, and may be varied.

FIGS. 4 through 8 are plan views each schematically illustrating an antenna device, according to an embodiment.

Figure 4:
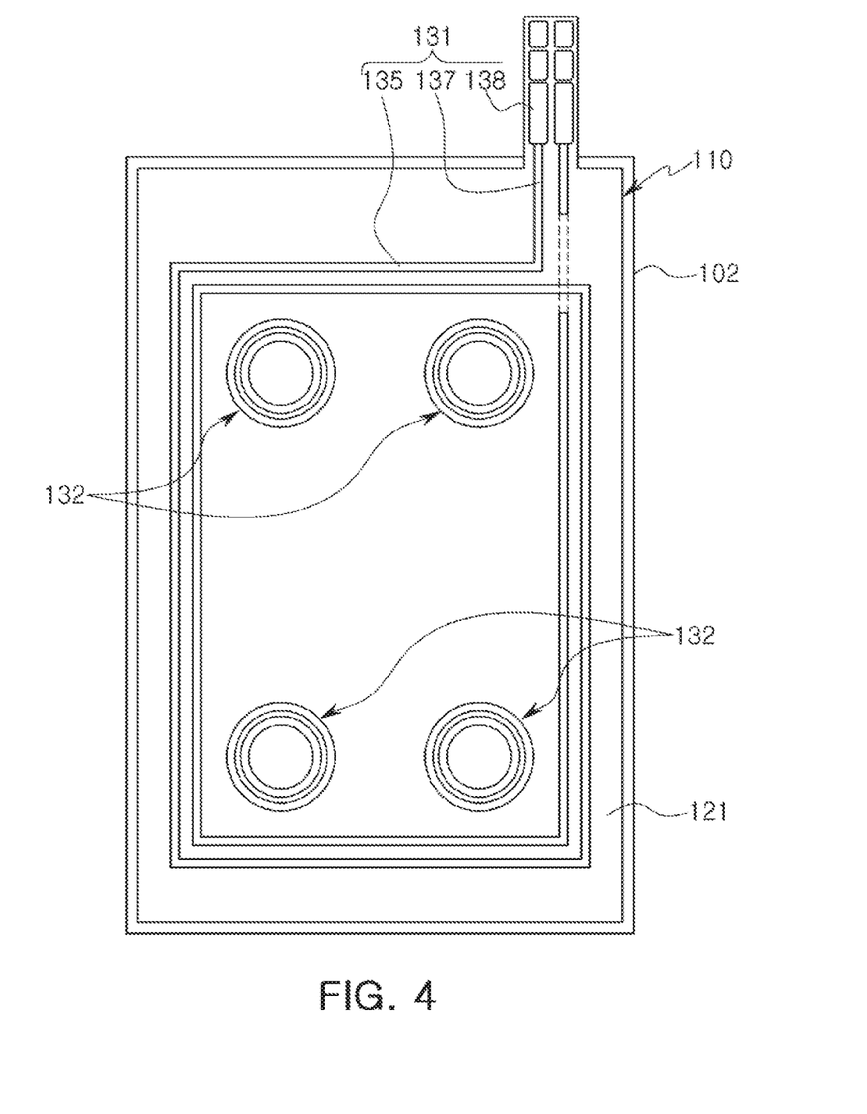
FIGS. 4 through 8 are plan views each schematically illustrating an antenna device, according to an embodiment.

First, referring to FIG. 4, the antenna device includes a plurality of second wirings 131 disposed in the first wiring 132.

The respective second wirings 132 are disposed to be spaced apart from each other, and each is disposed at corner portions of the first wiring 131 formed in a quadrangular shape.

In an example, the magnetic field is concentrated on various regions, excluding a region in the first wiring 131, and as a result, the antenna is easily recognized at various positions, not a specific position, during NFC.

Figure 5:
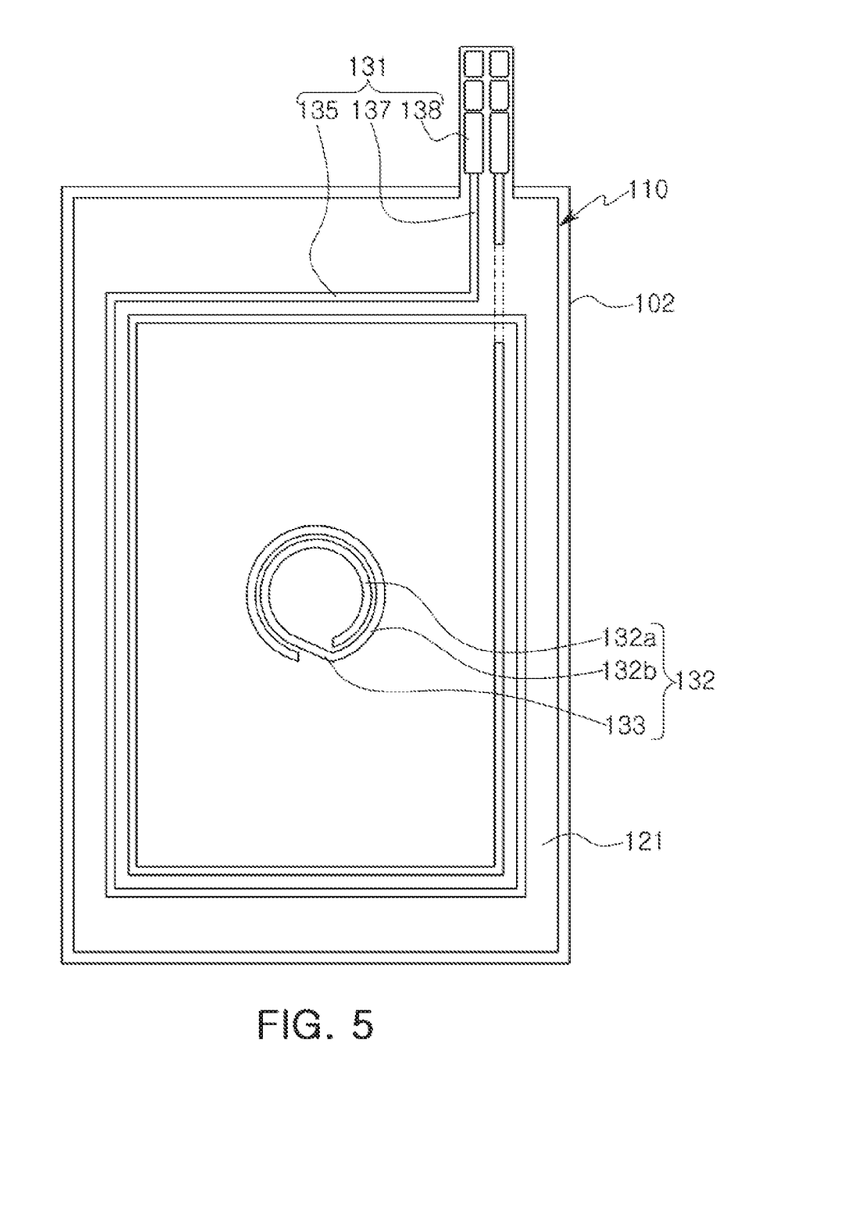

Referring to FIG. 5, the second wiring 132 of the antenna device includes a connection wiring 133 electrically connecting the first ring-shaped wiring 132a and the second ring-shaped wiring 132b to each other. In addition, the first ring-shaped wiring 132a and the second ring-shaped wiring 132b are formed in an arc shape having two ends, not a perfect circle.

The connection wiring 133 connects one end of the first ring-shaped wiring 132a and one end of the second ring-shaped wiring 132b to each other. Therefore, the first ring-shaped wiring 132a and the second ring-shaped wiring 132b forms one linear wiring having both ends by the connection wiring 133.

According to an embodiment, the first ring-shaped wiring 132a and the second ring-shaped wiring 132b are electrically connected by the connection wiring 133, but as described above, upon the frequency of the magnetic field generated from the first wiring 131 being the high frequency, the current resistance is increased and reactance is decreased in the second wiring 132. Therefore, similarly to an embodiment described above, the flow of current (e.g., the inner diameter and outer diameter direction) is generated in the form of capacitor in the second wiring 132, and as a result, the same effect as the embodiment described above may be achieved.

Figure 6:
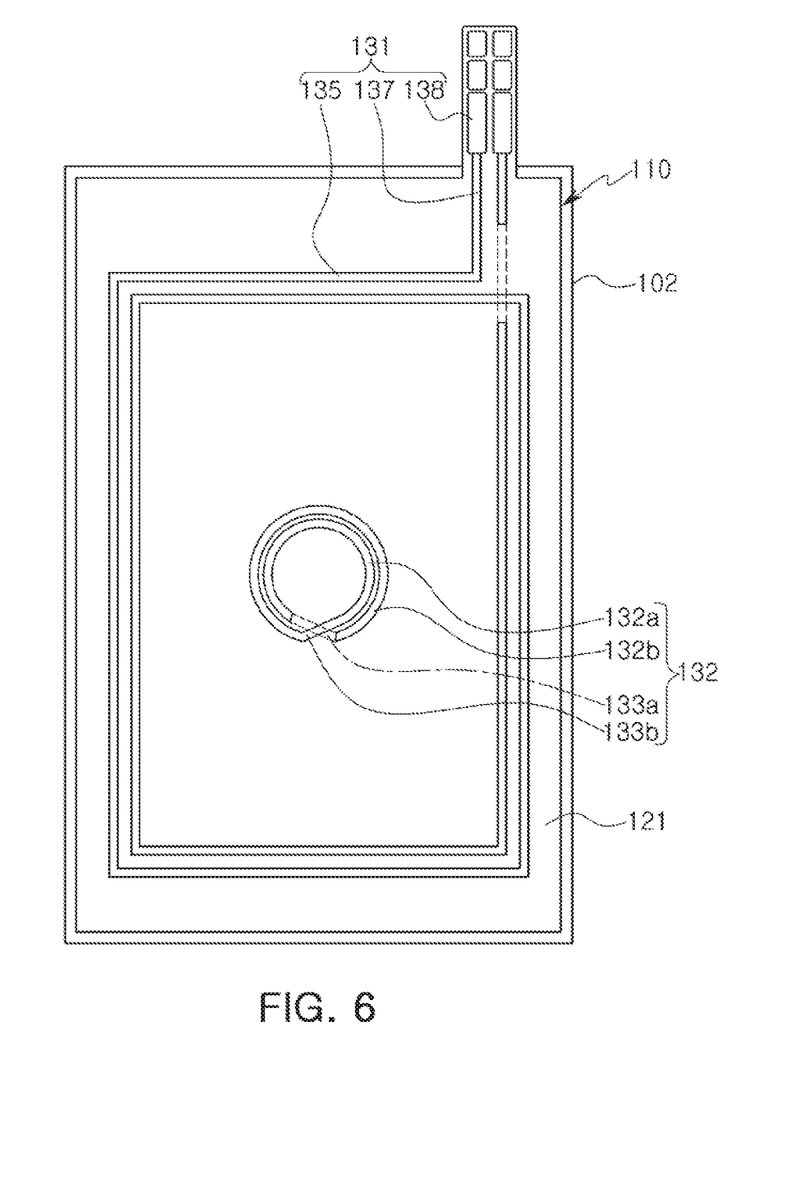

Referring to FIG. 6, the second wiring 132 of the antenna device, according to an embodiment, includes first and second connection wirings 133a and 133b that electrically connect the first ring-shaped wiring 132a and the second ring-shaped wiring 132b to each other. Accordingly, the first ring-shaped wiring 132a and the second ring-shaped wiring 132b are formed in an arc shape having two ends, not a perfect circle.

The first connection wiring 133a connects one end of the first ring-shaped wiring 132a and one end of the second ring-shaped wiring 132b to each other. In addition, the second connection wiring 133b connects the other end of the first ring-shaped wiring 132a and the other end of the second ring-shaped wiring 132b to each other.

Therefore, the first ring-shaped wiring 132a and the second ring-shaped wiring 132b form a continuous one linear wiring, and form a closed loop.

The first connection wiring 133a and the second connection wiring 133b are each disposed on different surfaces of the insulating substrate 121 so that the first connection wiring 133a and the second connection wiring 133b do not overlap each other. In an alternative embodiment, the first connection wiring 133a and the second connection wiring 133b may be disposed on same surfaces of the insulating substrate 121, however, the configuration of both the first connection wiring 133a and 133b would be such that both wirings do not overlap with each other.

Figure 7:
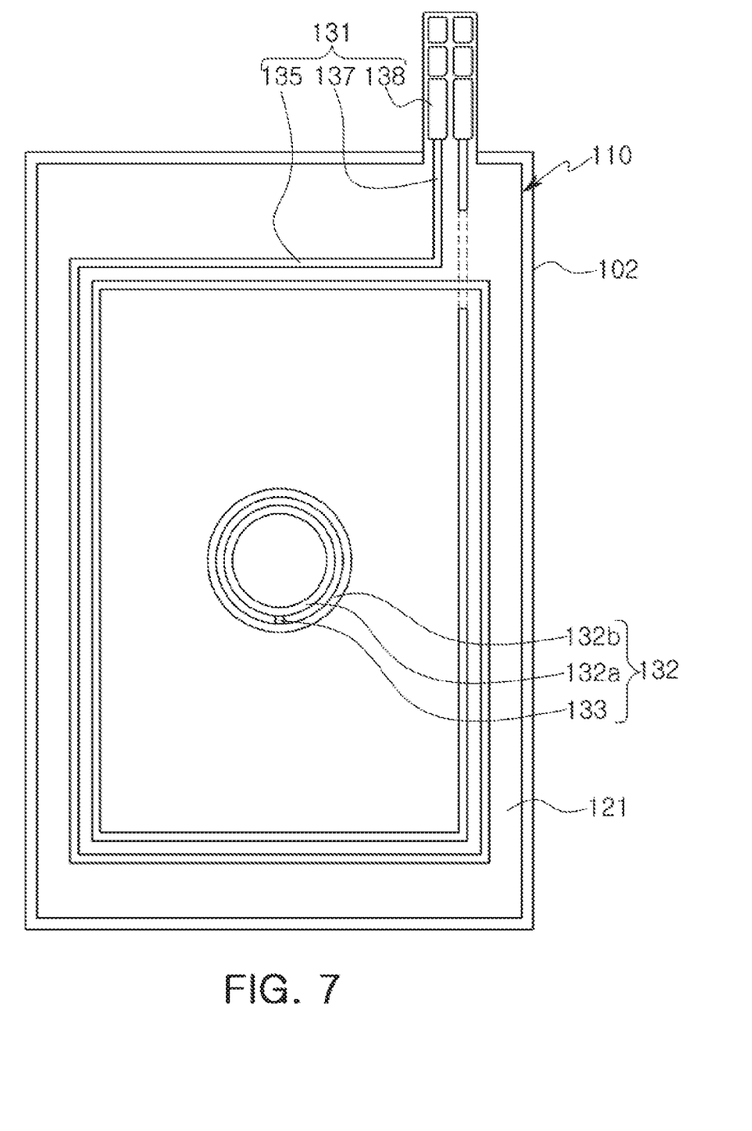

Referring to FIG. 7, the second wiring 132 of the antenna device, according to an embodiment, includes the connection wiring 133 electrically connecting the first ring-shaped wiring 132a to the second ring-shaped wiring 132b.

The connection wiring 133 connects the first ring-shaped wiring 132a to the second ring-shaped wiring 132b, which are formed in a perfect circular shape.

The connection wiring 133 is formed in an outer diameter direction of the first ring-shaped wiring 132a. However, the connection wiring 133 is not limited thereto, and may be formed in various shapes as long as the connection wiring 133 connects the first ring-shaped wiring 132a to the second ring-shaped wiring 132b.

Figure 8:
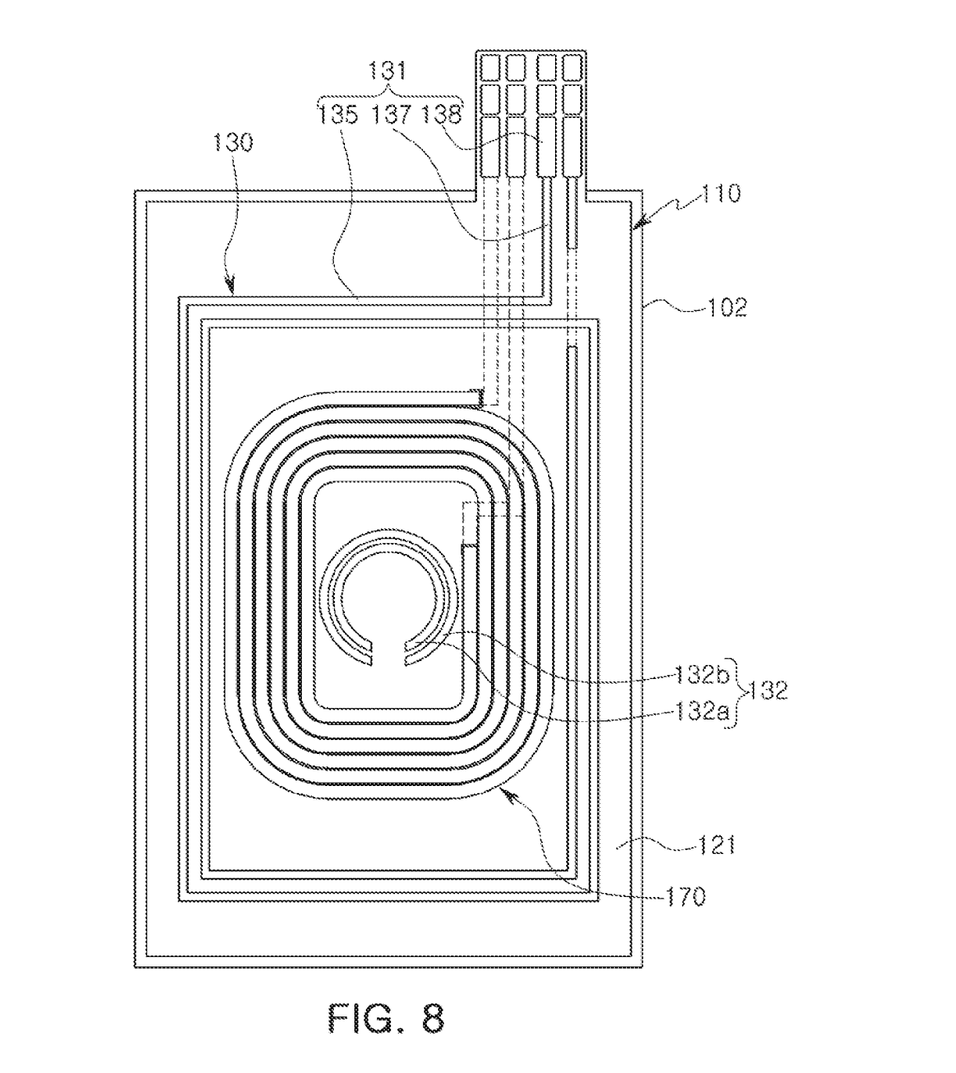

Referring to FIG. 8, the coil part 110 of the antenna device according to an embodiment includes an antenna wiring 130 used as an antenna, and a coil wiring 170 used to transmit and receive power for wireless charging.

The antenna wiring 130 performs at least one function of radio frequency identification (RFID), near field communication (NFC), and magnetic secure transmission (MST), and according to an embodiment, the antenna wiring 130 may be used as an NFC antenna.

The antenna wiring 130 includes the first wiring 131 and the second wiring 132 as in the embodiment described above.

The coil wiring 170 is disposed in the antenna wiring 130. According to an embodiment, the coil wiring 170 is disposed on a region formed between the first wiring 131 and the second wiring 132. However, the configuration of the present disclosure is not limited thereto, and the coil wiring 170 may be selectively disposed in inside or outside of the antenna wiring 130.

According to an embodiment, the first ring-shaped wiring 132a and the second ring-shaped wiring 132b of the second wiring 132 are formed in an arc shape having two ends, not a perfect circle. In addition, the first ring-shaped wiring 132a and the second ring-shaped wiring 132b are not connected to each other.

A disconnected portion of the first ring-shaped wiring 132a is disposed or positioned to align with or to correspond to a disconnected portion of the second ring-shaped wiring 132b.

As such, in the case in which the first ring-shaped wiring 132a and the second ring-shaped wiring 132b are formed in the arc shape, an occurrence of a repulsion current for a coil of a low frequency band (e.g., the coil wiring) is blocked. Therefore, upon the coil wiring 170 of the low frequency and the antenna wiring 130 of the high frequency being simultaneously used, an influence on the coil wiring 170 decreases.

In addition, in an example in which the antenna wiring 130 and the coil wiring 170 are disposed together on the insulating substrate 121, a phenomenon that a center of the magnetic field generated from the antenna wiring 130 is moved to a unwanted position due to the coil wiring 170 may occur. However, because the antenna device limits the center of the magnetic field to a desired position using the second wiring 132, a shape of the magnetic field is controlled to be configured to a desired shape, even though a plurality of antenna wirings 130 or coil wirings 170 may be complexly formed on one insulating substrate 121.

Furthermore, as described above, the antenna wiring 130 further includes a wiring (hereinafter, referred to as a third wiring (not illustrated)) similar to the first wiring 131, as needed.

The third wiring is disposed in the inside or the outside of the first wiring 131 similarly to the coil wiring 170. In this example, the first wiring 131 is used for NFC, and the third wiring is used for MST.

As set forth above, in the antenna device, according to various embodiments, the magnetic flux is concentrated on the specific position using the ring-shaped wiring of the dummy coil form. Therefore, at the time of performing NFC, the recognition rate for the NFC tag is increased. In addition, because the conventional antenna device is utilized, the antenna device is easily manufactured.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna device, comprising:
a coil part having an antenna wiring, the antenna wiring including a first wiring comprising a spiral shape forming an empty region therein and a second wiring disposed inside or outside of the first wiring;
a magnetic part comprising a flat plate shape disposed on one side of the coil part and connected to the coil part to provide a magnetic path of a magnetic field generated by the antenna wiring of the coil part;
wherein the second wiring is disposed to be spaced apart from the first wiring, and comprises a first ring-shaped wiring and a second ring-shaped wiring, which are concentric to each other; and
wherein the first ring-shaped wiring and the second ring-shaped wiring are formed to be circular.

2. The antenna device of claim 1, wherein second wirings are disposed inside of the first wiring.

3. The antenna device of claim 1, wherein the second wiring further comprises a connection wiring connecting the first ring-shaped wiring to the second ring-shaped wiring.

4. The antenna device of claim 1, wherein the first ring-shaped wiring and the second ring-shaped wiring are each formed in an arc shape having two ends.

5. The antenna device of claim 4, wherein the second wiring comprises a first connection wiring connecting one end of the first ring-shaped wiring to one end of the second ring-shaped wiring.

6. The antenna device of claim 5, wherein the second wiring comprises a second connection wiring connecting another end of the first ring-shaped wiring to another end of the second ring-shaped wiring.

7. The antenna device of claim 5, wherein the two ends of the first ring-shaped wiring is aligned with the two ends of the second ring-shaped wiring so that a disconnected portion of the first ring-shaped wiring is disposed to correspond to a disconnected portion of the second ring-shaped wiring.

8. The antenna device of claim 1, further comprising:
a coil wiring disposed inside or outside of the first wiring and configured to perform wireless power transmission.

9. The antenna device of claim 1, further comprising:
a third wiring disposed inside or outside of the first wiring and configured to perform magnetic secure transmission (MST).

10. The antenna device of claim 1, wherein a distance between the first ring-shaped wiring and the second ring-shaped wiring is 400 μm or less.

11. The antenna device of claim 1, wherein the first wiring is configured to perform as a near field communication (NFC) antenna or a magnetic resonance wireless charging coil.

12. The antenna device of claim 1, wherein the first wiring and the second wiring are formed as a circuit pattern on an insulating substrate, and
the first ring-shaped wiring and the second ring-shaped wiring are disposed on one surface of the insulating substrate.

13. The antenna device of claim 1, wherein the second wiring is disposed within a range of a magnetic field formed by the first wiring.

14. The antenna device of claim 1, wherein the coil part is configured to concentrate a magnetic flux by generating the magnetic field utilizing a capacitance generated between the first and the second ring-shaped wirings.

15. A portable terminal, comprising:
a terminal body;
a coil part having an antenna wiring, the antenna wiring including a first wiring comprising a spiral shape electrically connected to the terminal body and a second wiring disposed inside or outside of the first wiring; and
a magnetic part comprising a flat plate shape disposed on one side of the coil part and connected to the coil part to provide a magnetic path of a magnetic field generated by the antenna wiring of the coil part,
wherein the first ring-shaped wiring and the second ring-shaped wiring are formed to be circular, and
wherein the second wiring includes a pair of ring-shaped wirings being concentric and comprising different diameters.

16. The portable terminal of claim 15, wherein the pair of ring-shaped wirings are disposed on a same plane.

17. The portable terminal of claim 15, wherein the second wiring is disconnected from the terminal body.

* * * * *